United States Patent
Burton et al.

(10) Patent No.: US 10,708,675 B2
(45) Date of Patent: Jul. 7, 2020

(54) ACTIVITY MONITORING

(71) Applicant: RHEON LABS LTD, London (GB)

(72) Inventors: Thomas Burton, London (GB); Daniel Plant, London (GB)

(73) Assignee: RHEON LABS LTD, London (GB)

(*) Notice: Subject to any disclaimer, the term of this patent is extended or adjusted under 35 U.S.C. 154(b) by 0 days.

(21) Appl. No.: 16/405,492

(22) Filed: May 7, 2019

(65) Prior Publication Data
US 2019/0297398 A1    Sep. 26, 2019

Related U.S. Application Data

(63) Continuation of application No. PCT/GB2017/053339, filed on Nov. 7, 2017.

(30) Foreign Application Priority Data

Nov. 7, 2016   (GB) .................................. 1618754.4

(51) Int. Cl.
| | | |
|---|---|---|
| *H04Q 9/00* | (2006.01) | |
| *H04W 76/10* | (2018.01) | |
| *H04W 4/02* | (2018.01) | |
| *G08B 21/04* | (2006.01) | |
| *H04B 5/00* | (2006.01) | |

(Continued)

(52) U.S. Cl.
CPC ........... *H04Q 9/00* (2013.01); *G08B 21/0446* (2013.01); *H04B 5/0031* (2013.01); *H04W 4/026* (2013.01); *H04W 4/06* (2013.01); *H04W 4/80* (2018.02); *H04W 76/10* (2018.02); *G08B 21/0453* (2013.01); *G08C 2201/93* (2013.01); *H04Q 2209/43* (2013.01); *H04Q 2209/47* (2013.01); *H04Q 2209/823* (2013.01); *H04Q 2209/88* (2013.01)

(58) Field of Classification Search
CPC .. H04Q 9/00; H04Q 2209/47; H04Q 2209/88; H04Q 2209/823; H04Q 2209/43; G08B 21/0446; G08B 21/0453; H04B 5/0031; H04W 4/06; H04W 4/80; H04W 76/10; H04W 4/026; G08C 2201/93; G08C 17/02; A61B 5/0026; A61B 5/0024; A61B 5/112; A61B 5/1117; A61B 5/1118
See application file for complete search history.

(56) References Cited

U.S. PATENT DOCUMENTS

| | | | | |
|---|---|---|---|---|
| 10,413,218 | B2* | 9/2019 | Yamato | A61B 5/1118 |
| 2006/0224048 | A1* | 10/2006 | Devaul | A61B 5/0024 |
| | | | | 600/300 |

(Continued)

FOREIGN PATENT DOCUMENTS

| | | |
|---|---|---|
| EP | 2963953 A1 | 1/2016 |
| WO | 2008097524 A2 | 8/2008 |
| WO | 2013175741 | 11/2013 |

*Primary Examiner* — An T Nguyen
(74) *Attorney, Agent, or Firm* — Patterson + Sheridan LLP

(57) ABSTRACT

Certain aspects of the present disclosure provide measures, including apparatuses, circuitry, methods and computer programs, for use in monitoring user activity. Orientation data for a user is generated. The generated orientation data is inserted into advertising packets of a wireless communication protocol. The advertising packets comprising the generated orientation data are broadcast according to the wireless communication protocol.

28 Claims, 4 Drawing Sheets

(51) Int. Cl.
    *H04W 4/06*          (2009.01)
    *H04W 4/80*          (2018.01)

(56)             References Cited

U.S. PATENT DOCUMENTS

| | | | |
|---|---|---|---|
| 2008/0181252 A1* | 7/2008 | Rofougaran | H04L 12/40013 |
| | | | 370/451 |
| 2011/0205081 A1* | 8/2011 | Chen | H04Q 9/00 |
| | | | 340/870.01 |
| 2013/0278414 A1* | 10/2013 | Sprigg | G08B 21/0453 |
| | | | 340/539.12 |
| 2014/0106677 A1 | 4/2014 | Altman | |
| 2014/0273858 A1* | 9/2014 | Panther | A61B 5/0002 |
| | | | 455/41.2 |
| 2014/0375461 A1 | 12/2014 | Richardson et al. | |
| 2015/0245164 A1* | 8/2015 | Merrill | H04W 4/06 |
| | | | 370/329 |
| 2015/0281364 A1* | 10/2015 | Connolly | H04L 67/12 |
| | | | 709/217 |
| 2016/0014677 A1* | 1/2016 | Chen | H04W 4/21 |
| | | | 455/434 |
| 2016/0189151 A1* | 6/2016 | He | G06Q 20/401 |
| | | | 705/75 |
| 2016/0262191 A1* | 9/2016 | Flynn | H04W 76/10 |
| 2016/0353502 A1* | 12/2016 | Folske | H04W 8/005 |
| 2017/0215124 A1* | 7/2017 | Wang | H04W 40/244 |
| 2018/0091965 A1* | 3/2018 | Watson | H04W 4/08 |
| 2019/0069329 A1* | 2/2019 | Singh | H04W 76/18 |
| 2019/0297398 A1* | 9/2019 | Burton | H04W 76/10 |

* cited by examiner

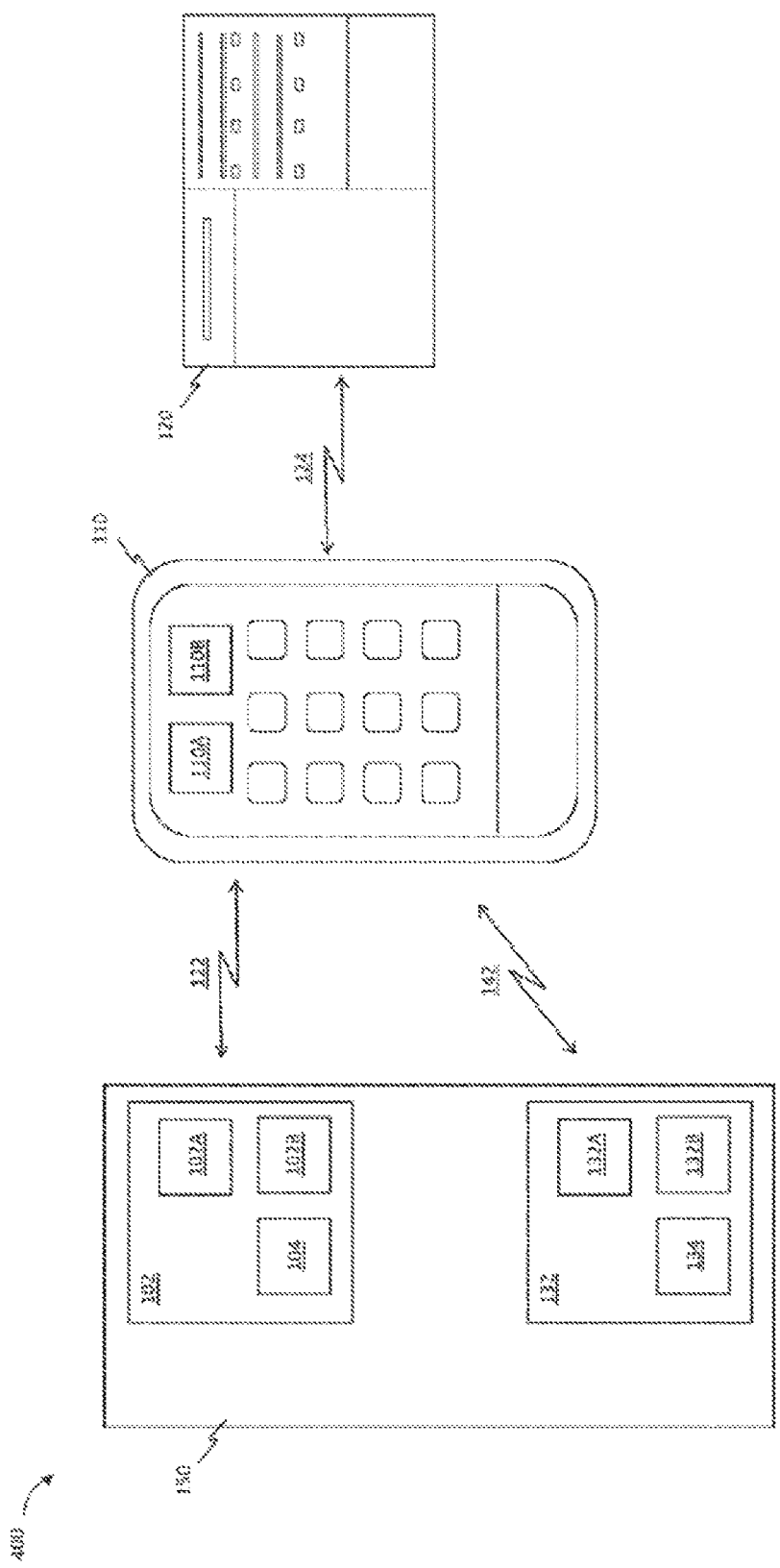

ACTIVITY MONITORING

CROSS-REFERENCE TO RELATED APPLICATIONS

This application is a continuation of International Application PCT/GB2017/053339, filed on Nov. 7, 2017, which claims priority to GB Application No. 1618754.4, filed on Nov. 7, 2016, both of which are incorporated by reference herein in their entirety.

INTRODUCTION

The present invention relates to user activity monitoring. In particular, but not exclusively, the present invention relates to low power monitoring of user activity.

Known user activity monitoring systems include wrist worn activity monitors such as FITBIT® or smart watches. These known systems track user activity levels gathered from motion data, heart rate, etc. and either store the information locally or transmit the results to another device such as a smartphone.

Difficulties arise when it is desired to monitor a person's activity levels for prolonged periods, for example throughout the day. To collect data from a sensor such as an accelerometer over a wireless link can use a large amount of power. If the power source for such a sensor and wireless link is limited, for example a non-rechargeable or non-replaceable battery, then it is important that power usage is as low power as possible.

BRIEF SUMMARY

According to a first aspect of the present invention, there is provided apparatus for use in monitoring user activity, the apparatus being configured to: generate orientation data for a user; insert the generated orientation data into advertising packets of a wireless communication protocol; and broadcast the advertising packets comprising the generated orientation data according to the wireless communication protocol.

According to a second aspect of the present invention, there is provided a wearable item comprising the apparatus of the first aspect.

According to a third aspect of the present invention, there is provided circuitry for use in monitoring user activity, the circuitry being configured to: generate orientation data for a user;
insert the generated orientation data into advertising packets of a wireless communication protocol; and broadcast the advertising packets comprising the generated orientation data according to the wireless communication protocol.

According to a fourth aspect of the present invention, there is provided a method of monitoring user activity, the method comprising: generating orientation data for a user; inserting the generated orientation data into advertising packets of a wireless communication protocol; and broadcasting the advertising packets comprising the generated orientation data according to the wireless communication protocol.

According to a fifth aspect of the present invention, there is provided a computer program comprising a set of instructions, which, when executed by a computerized device, cause the computerized device to perform a method of monitoring user activity, the method comprising: generating orientation data for a user; inserting the generated orientation data into advertising packets of a wireless communication protocol; and broadcasting the advertising packets comprising the generated orientation data according to the wireless communication protocol.

Embodiments may be provided in the form of a non-transitory computer-readable storage mediums comprising computer-executable instructions which, when executed by a processor, cause a computing device to perform a method of monitoring user activity.

According to a sixth aspect of the present invention, there is provided apparatus for use in monitoring user activity, the apparatus being configured to: generate first orientation data for a user of the apparatus at a first repetition frequency; broadcast the generated first orientation data according to broadcasting functionality of a wireless communication protocol; in response to receiving a connection request from a remote device, establish a connection with the remote device according to the wireless communication protocol; generate second orientation data for the user of the apparatus at a second, higher repetition frequency; and transmit the generated second orientation data via the connection established with the remote device according to the wireless communication protocol.

According to a seventh aspect of the present invention, there is provided a device configured to operate either in a relatively low power mode or a relatively high power mode, wherein when operating in the relatively low power mode, the device is configured to: generate orientation data for a user; and broadcast the generated orientation data in advertising packets of a wireless communication protocol, and wherein when operating in the relatively high power mode, the device is configured to: generate further orientation data for the user; and transmit the further orientation data to a remote device via a communication session established with the remote device.

According to an eighth aspect of the present invention, there is provided apparatus for use in monitoring user activity, the apparatus being configured to: receive orientation data broadcast by a user device, the broadcast orientation data having been generated by the user device in relation to activity of a user of the user device; analyze the received broadcast orientation data for the presence of a predetermined activity pattern of the user; and in response to the analysis indicating that the predetermined activity pattern of the user is present, cause transmittal of a request to the user device, the request being operable to cause the user device to: establish a connection with the apparatus; and transmit orientation data generated by the user device in relation to activity of the user of the user device via the established connection rather than via broadcast.

According to a ninth aspect of the present invention, there is provided apparatus for use in monitoring user activity, the apparatus being configured to: receive first orientation data broadcast by a first user device in advertising packets of a wireless communication protocol, the first broadcast orientation data having been generated by the first user device in relation to activity of a user of the first user device; receive second orientation data broadcast by a second user device in advertising packets of a wireless communication protocol, the second broadcast orientation data having been generated by the second user device in relation to activity of the user, wherein the first user device and the second user device are comprised in an item worn by the user and wherein the first user device and the second user device are spatially apart from each other in the item worn by the user; analyze the received first and second broadcast orientation data for an indication of a movement activity pattern of the user; in response to the analysis indicating a positive indication, cause establishment of a first communication session with the first user device and establishment of a second communication session with the second user device; transmit a first command to the first user device which is operable to cause the first user device to transmit orientation data generated by the first user device to the apparatus via the first communication session; and transmit a second command to the second user device which is operable to cause the second user device to transmit orientation data generated by the second user device to the apparatus via the second communication session.

According to a tenth aspect of the present invention, there is provided apparatus for use in monitoring user activity, the apparatus being configured to: generate biometric data for a user; insert the generated biometric data into advertising packets of a wireless communication protocol; and broadcast the advertising packets comprising the generated biometric data according to the wireless communication protocol.

According to an eleventh aspect of the present invention, there is provided apparatus substantially in accordance with any of the examples as described herein with reference to and illustrated by the accompanying drawings.

According to a twelfth aspect of the present invention, there is provided methods substantially in accordance with any of the examples as described herein with reference to and illustrated by the accompanying drawings.

Further features and advantages of the invention will become apparent from the following description of preferred embodiments of the invention, given by way of example only, which is made with reference to the accompanying drawings.

BRIEF DESCRIPTION OF THE DRAWINGS

FIG. 4 shows a system diagram according to embodiments.

DETAILED DESCRIPTION

Embodiments relate to measures, including apparatus, methods, computer programs and computer program products, for use in monitoring user activity.

Embodiments provide low power activity monitoring for use in applications where it is important to be able to calculate a person's activity levels throughout the day using one or more accelerometers.

In some applications there may be limited power available which makes it impractical to continuously collect high-resolution data. Embodiments allow identification of when to connect to a monitoring device or devices to obtain higher resolution sample data. Embodiments allow capture of high sample rate gait data using a very low power system to identify key time periods to monitor a person's activities.

Embodiments described herein are suitable for applications where a battery is sealed in with a monitoring device, for example such that the battery is non-rechargeable and/or non-replaceable.

Some embodiments involve monitoring activity levels, gait data and motion data for a hip protector device with embedded electronic sensor(s) and transmitter(s).

Figure 1:
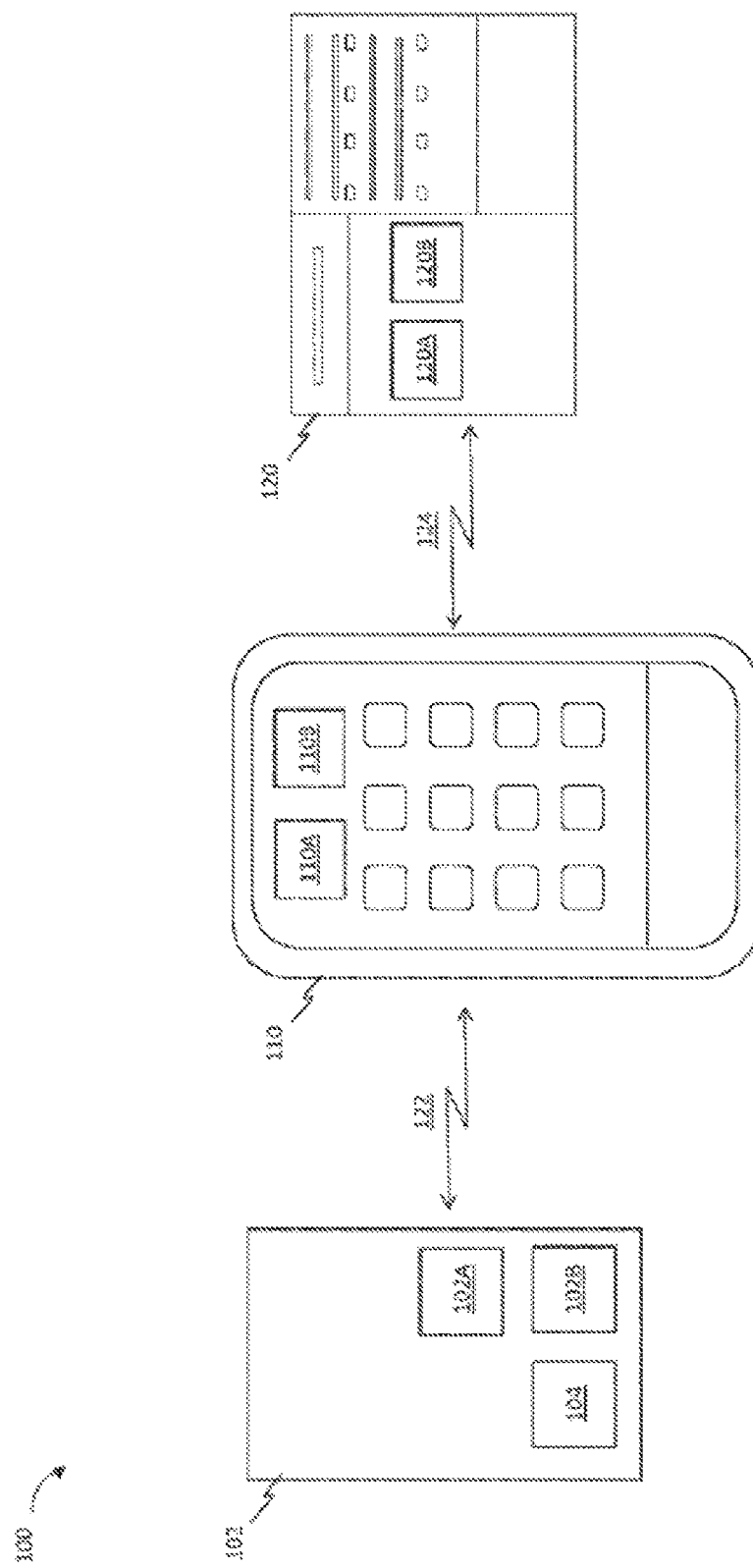
FIG. 1 shows a system diagram according to embodiments.

FIG. 1 shows a diagram of a system 100 according to embodiments. System 100 comprises apparatus 102, device 110 and server 120.

Apparatus 102 comprises a wireless transceiver 102A which is capable of communicating via one or more wireless communication protocols according to embodiments. Apparatus 102 also comprises one or more processors and/or one or more memories 102B which are capable of providing various data processing and data storage/retrieval tasks according to embodiments. Apparatus 102 also comprises one or more sensors 104 which are capable of sensing one or more parameters associated with the activity of a user of apparatus 102.

Apparatus 102 is able to communicate with other devices such as device 110 over one or more wireless communication links (or paths) 122. Apparatus 102 may also be able to communicate with other devices (not shown) via one or more wired communication links (not shown).

In some embodiments, wireless link 122 comprises a wireless link over which a wireless communication protocol such as BLUETOOTH™, WIFI™, radio frequency identification (RFID), ANT™, ANT+™, ZIGBEE™, infrared (IR), Radio, Audio or optical communication technology is employed.

In some embodiments, wireless link 122 comprises a short range wireless link. The term "short" here is used to indicate a relatively short range wireless link compared to a relatively wide (or "long") range wireless link over which a wide range wireless communication protocol (such as a cellular communication protocol) is employed.

In some embodiments, wireless link 124 comprises a wide range wireless link over which various cellular communication protocols (such as Long Term Evolution (LTE)) are employed.

Device 110 comprises a wireless transceiver 110A which is capable of communicating via one or more wireless communication protocols according to embodiments. Device 110 also comprises one or more processors and/or one or more memories 110B capable of providing various data processing and data storage/retrieval tasks according to embodiments. Device 110 is able to communicate with other devices such as apparatus 102 over wireless communication link 122 and server 120 over wireless communication link 124. Device 110 may also be able to communicate with other devices (not shown) via one or more other wireless communicate links (not shown) or one or more wired communication links (not shown).

In embodiments, one or more of wireless links 122 or 124 comprises a radio frequency (RF) wireless link.

In some embodiments, device 110 comprises a mobile (cellular) telephone capable of communicating via a mobile telephone network (not shown). In other embodiments, device 110 comprises a wireless access point capable of communicating via a packet-switched network (not shown) such as the Internet.

Server 120 comprises one or more wireless and/or wired transceivers (120A) which are capable of communicating via one or more wireless or wired communication protocols according to embodiments. Server 120 may be connected to one or more packet switched communication networks (not shown) which operate an Internet Protocol (IP). Server 120 also comprises one or more processors and/or one or more memories 120B capable of providing various data processing and data storage/retrieval tasks according to embodiments.

Figure 2:
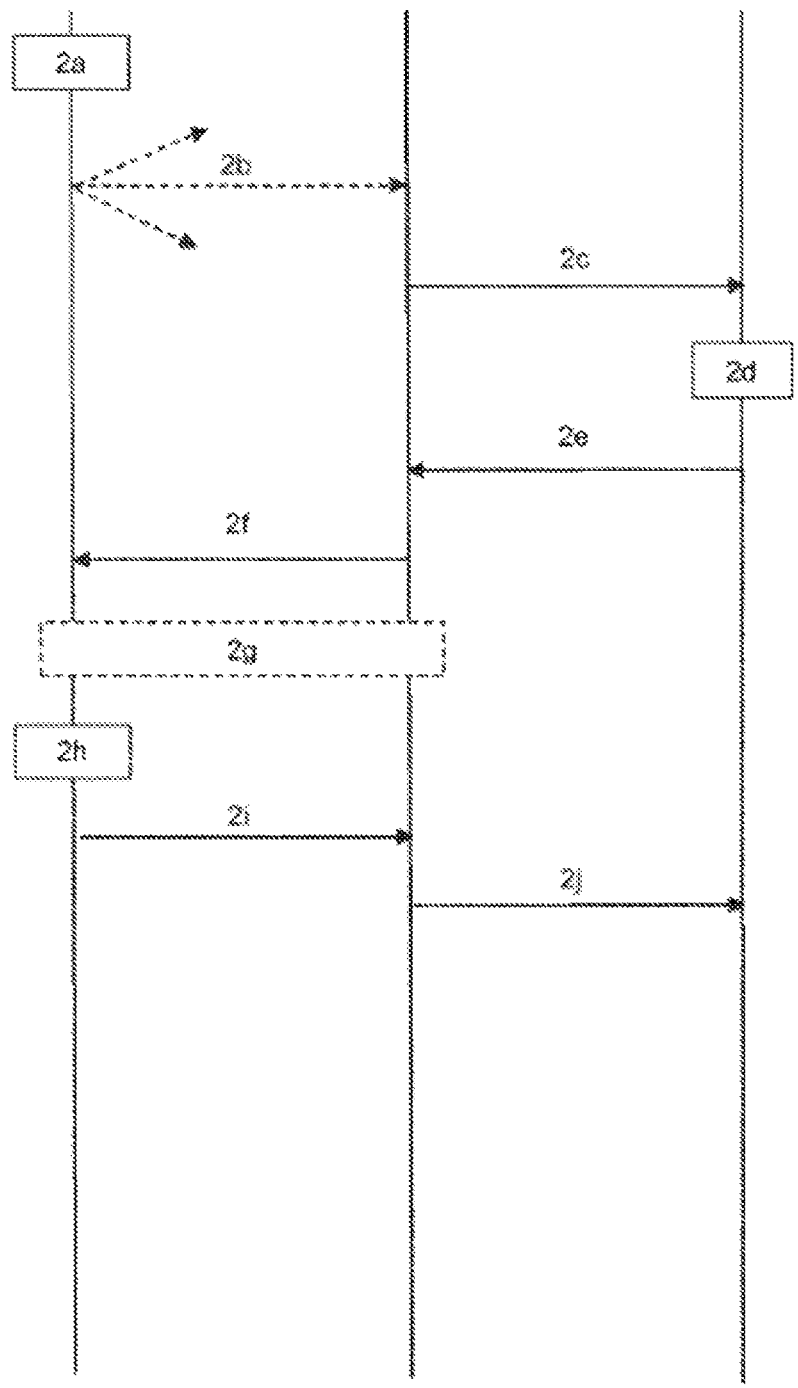
FIG. 2 shows a message flow diagram according to embodiments.

FIG. 2 shows a message flow diagram according to embodiments.

In the embodiments depicted in FIG. 2, apparatus 102 is configured to generate orientation data for a user of apparatus 102, as per element 2a. In embodiments, sensor 104 of apparatus 102 comprises an accelerometer and the orientation data is generated by the accelerometer. In embodiments, the generated orientation data comprises current x, y, and z axis positional data for the user.

Apparatus 102 inserts the generated orientation data into advertising packets of a wireless communication protocol and broadcasts the advertising packets comprising the generated orientation data according to the wireless communication protocol, as per element 2b.

In embodiments, apparatus 102 is configured to repeat the generating, inserting and broadcasting of orientation data at a first repetition frequency. In other words, apparatus 102 performs the generating, inserting and broadcasting repeatedly at a first frequency (or repeats at a first periodic interval).

Device 110 receives the advertising packets broadcast by apparatus 102 which contain the generated orientation data and forwards the generated orientation data to server 120, as per element 2c.

Server 120 processes the orientation data it receives for an indication of the presence of a predetermined activity pattern of the user, as per element 2d. The predetermined activity pattern may for example be indicative of the user walking.

In response to the processing by server 120 indicating the presence of the predetermined activity pattern of the user, the server initiates transmittal of a connection request to apparatus 102 in step 2e. In the embodiments of FIG. 2, device 110 forwards the connection request to apparatus 102 in step 2f.

A connection request is thus received by apparatus 102 in response to processing of the broadcast orientation data received by server 120 indicating the presence of a predetermined activity pattern of the user.

In response to the broadcasting, apparatus 102 receives a connection request from device 110 and establishes a connection with device 110 according to the wireless communication protocol as per element 2g. In embodiments, the established connection is a two-way (duplex) connection.

In embodiments, server 120 also generates a command for apparatus 102 to generate further orientation data for the user of apparatus 102 at a second repetition frequency. In other words, apparatus 102 is commanded to perform the generating of further orientation data repeatedly at a second frequency (or repeats at a second periodic interval).

In embodiments, the command is transmitted to apparatus 102 via the established connection.

In embodiments, the second repetition frequency is higher than the first repetition frequency.

In embodiments, the first repetition frequency is less than or equal to 1 Hz.

In embodiments, the second repetition frequency is greater than or equal to 50 Hz.

In embodiments, the second repetition frequency is between 50 and 100 Hz.

In some embodiments, the command is transmitted to apparatus 102 from server 120 in conjunction with the connection request of elements 2e and 2f, but in other embodiments, the command is transmitted in a separate messaging process (not shown).

Upon receipt of the command from device 110 via the established connection, apparatus 102 generates further orientation data for the user of apparatus 102 at the second repetition frequency as per element 2h.

Apparatus 102 now transmits, at the second repetition frequency, the further generated orientation data to device 110 via the connection established with device 110 as per element 2i.

Device 110 forwards the further generated orientation data at the second repetition frequency to server 120 as per element 2j.

In embodiments, in response to receipt of the command, apparatus 102 discontinues the inserting and broadcasting of orientation data. Apparatus 102 thus switches from broadcasting orientation data generated at a relatively low (first) repetition frequency to transmittal of further orientation data generated at a relatively high (second) repetition frequency.

In embodiments, the generation and broadcasting of orientation data at the relatively low repetition frequency consumes less power (which may be considerably less) than the generation and transmittal of orientation data at the relatively high repetition frequency. The generating and broadcasting of orientation data at the relatively low repetition frequency can be seen as a (relatively) low power operational mode for apparatus 102, whereas the generating and transmittal of orientation data at the relatively high repetition frequency via the established connection can be seen as a (relatively) high power operational mode for apparatus 102. By having apparatus 102 switch between such low power and high power modes, limited battery power resources at apparatus 102 can be more efficiently utilised.

For example, if monitoring of a user's walking activity is of interest, then apparatus 102 can be configured to remain in the low power mode if the orientation data it broadcasts indicates for example that the user is currently sitting down or suchlike, or that at a certain time or during a certain time period of the day the user is likely to be sitting down. However, if the orientation data that apparatus 102 broadcasts indicates that the user is currently walking or that at a certain time of day the user is likely to be walking, then apparatus 102 can be switched into the high power mode at that time such that a higher resolution of orientation data can be obtained. Embodiments allow power to be saved by not operating apparatus 102 in the high power mode all of the time, but instead only operating in high power mode some of the time and operating in low power mode at other times.

In embodiments, server 120 further analyses the orientation data received via the established connection for the presence of a further predetermined activity pattern of the user. In response to the further analysis indicating that the further predetermined activity pattern of the user is present, server 102 causes transmittal of an alert message.

In embodiments, the further predetermined activity pattern is indicative of an imminent fall of the user. In such a situation, it is desirable for remedial action to be taken to prevent the user falling, so one or more alert messages can be transmitted to the user to alert the user or transmitted to other parties who may be able to assist the user.

In embodiments, an alert message is transmitted to device 110. In embodiments, an alert message is transmitted to apparatus 102 via the established connection. In embodiments, an alert message is transmitted to an emergency services operator. The alert message could for example comprise a text message such as a Short Message Service (SMS) transmitted via a cellular network or an instant message (IM) transmitted via an IP network such as the Internet.

In embodiments, apparatus 102 comprises a gyroscope. In some such embodiments, in response to receipt of the command, apparatus 102 is configured to activate the gyroscope. The gyroscope generates rotational data for the user of apparatus 102 at the second repetition frequency and transmits, at the second repetition frequency, the generated rotational data to device 110 via the connection established with device 110. In embodiments, device 110 forwards the generated rotational data to server 120 and server 120 may analyse the rotational data for any activity pattern(s) of interest.

In embodiments, apparatus 102 comprises a pressure sensor. In some such embodiments, in response to receipt of the command, apparatus 110 is configured to activate the pressure sensor. The pressure sensor generates pressure data for the user of apparatus 102 at the second repetition frequency and transmits, at the second repetition frequency, the generated pressure data to device 110 via the connection established with device 110. In embodiments, device 110 forwards the generated pressure data to server 120 and server 120 may analyse the pressure data for any activity pattern(s) of interest.

In alternative or additional embodiments to an accelerometer sensing orientation data for the user, a gyroscope sensing rotational data for the user or a pressure sensor sensing pressure data for the user, other types of sensor(s) may be employed to gather data in relation to the user. For example, one or more force sensors, acoustic sensors, Hall effect sensors, magnetic sensors, rotation sensors, temperature sensors, orientation sensors, barometric pressure sensors, humidity sensors, heart rate sensors, strain, optical and breathing rate sensors may be employed. In embodiments, any type of biometric data associated with the user may be generated. This could also include multiples of each sensor above, in different locations, or used over different ranges.

In embodiments, the wireless communication protocol comprises the BLUETOOTH LOW ENERGY™ (BLE) protocol and the advertising packets comprise BLE advertising packets. By placing the orientation data into BLE advertising packets, the system uses minimal extra power compared to operating in a 'normal' advertising mode.

Figure 3:
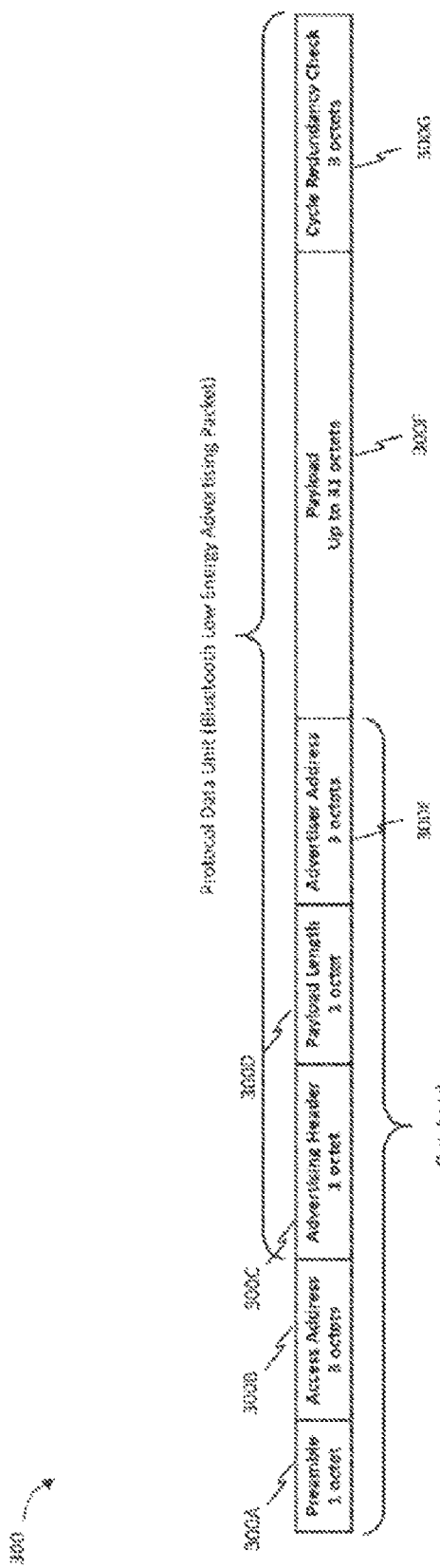
FIG. 3 shows a broadcast packet according to embodiments.

FIG. 3 shows a broadcast packet 300 according to embodiments. In these example embodiments, broadcast packet 300 comprises a BLE advertising packet. Broadcast packet 300 comprises a 1-octet (an 8-bit byte) preamble portion 300A, a 3-octet access address portion 300B, a 1-octet advertising header portion 300C, a 1-octet payload length portion 300D, a 3-octet advertiser address portion 300E, an up to 31-octet payload portion 300F and a 3-octet cyclic redundancy check portion 300G. The up to 31-octet payload portion 300F is intended (by Bluetooth core specification) to carry manufacturing specific data. In embodiments, the inserting of generated orientation data comprises apparatus 102 inserting the generated orientation data into manufacturing specific data portions of BLE advertising packets. In the embodiments of FIG. 3, generated orientation data is inserted into payload portion 300F.

In embodiments, apparatus 102 is configured to receive, via the connection established with device 110, a request to revert to generating orientation data for the user of the apparatus at the first repetition frequency. In such embodiments, apparatus 102 reverts to generating orientation data for the user of apparatus 102 at the first repetition frequency, inserting the orientation data generated at the first repetition frequency into advertising packets of the wireless communication protocol, and broadcasting the advertising packets comprising the generated orientation data according to the wireless communication protocol at the first repetition frequency. Apparatus can thus be requested (for example by server 120 or device 110) to enter a relatively low power activity monitoring mode when a relatively high power activity monitoring mode is no longer desired.

In embodiments, apparatus 102 comprises a further accelerometer. In some such embodiments, apparatus 102 is configured to, at the further accelerometer, generate further orientation data for the user, insert the further generated orientation data into further advertising packets of the wireless communication protocol, and broadcast the further advertising packets comprising the further generated orientation data according to the wireless communication protocol. Such embodiments therefore allow the capture and monitoring of orientation data from two stereoscopic sensors.

In embodiments, apparatus 102 is comprised in a wearable item worn by the user. The wearable item may for example comprise one or more of a hip protector, a back protector, a limb protector, body armour, a glove, a jacket, a helmet, a sports garment, an activity monitoring garment, a sensor equipped garment, personal protective equipment (PPE) (for example a 'hardhat' or 'knee guard') and a medical device. For PPE, this would allow for the monitoring of the device to see if it was being used and or worn as per employer guidelines.

According to embodiments, low temporal resolution (for example less than or equal to 1 Hz) orientation data obtained from a wearable item such as a hip protector can be used to create a profile of a person's general everyday activity levels from a very low power device located on the user. This data can then be used to predict when best to connect with the device to obtain high-temporal resolution (for example greater than or equal to 50 Hz) motion data from the device. Obtaining high resolution data allows for detailed analysis of a person's gait data such as cadence, instability, balance, symmetry, etc. By knowing when to connect to the sensor(s) from analysis of the low power-low temporal resolution data, snapshot high resolution data can be obtained for improved gait and motion analysis. For example, if it is learnt that a person tends to walk at a particular time of day, then that would be a good time to connect for a few seconds or more to obtain high quality gait data.

In embodiments where apparatus 102 comprises two (or more) accelerometers, the two (or more) accelerometers may be located remote from each other on a wearable item. For example, in the case of a hip protector, one accelerometer may be located in a left hip area of the hip protector and another accelerometer may be located in a right hip area of the hip protector.

In embodiments, apparatus 102 is encapsulated within a sealed enclosure. The sealed enclosure may for example comprise a strain rate sensitive material. In some such embodiments, apparatus 102 comprises a non-rechargeable battery and the non-rechargeable battery is encapsulated within the sealed enclosure.

Embodiments comprise apparatus for use in monitoring user activity. First orientation data for a user of the apparatus is generated at a first repetition frequency. The generated first orientation data is broadcast according to broadcasting functionality of a wireless communication protocol. In response to receiving a connection request from a remote device, a connection is established with the remote device according to the wireless communication protocol. Second orientation data for the user of the apparatus is generated at a second, higher repetition frequency. The generated second orientation data is transmitted via the connection established with the remote device according to the wireless communication protocol.

Embodiments comprise a device configured to operate either in a relatively low power mode or a relatively high power mode. When operating in the relatively low power mode, the device is configured to generate orientation data for a user, and broadcast the generated orientation data in advertising packets of a wireless communication protocol. When operating in the relatively high power mode, the device is configured to generate further orientation data for the user, and transmit the further orientation data to a remote device via a communication session established with the remote device. In embodiments, the device is configured to perform the generating and broadcasting of the orientation data when operating in the relatively low power mode at a lower frequency compared to the generating and transmitting of the further orientation data when operating in the relatively high power mode.

Embodiments comprise a device for use in monitoring user activity, the device being configured to receive orientation data broadcast by a user device, the broadcast orientation data having been generated by the user device in relation to activity of a user of the user device, analyse the received broadcast orientation data for the presence of a predetermined activity pattern of the user, and in response to the analysis indicating that the predetermined activity pattern of the user is present, cause transmittal of a request to the user device. The request is operable to cause the user device to establish a connection with the apparatus, and transmit orientation data generated by the user device in relation to activity of the user of the user device via the established connection rather than via broadcast. The device may for example comprise a network device such as a server or a user device such as a mobile telephone.

In embodiments, the broadcast orientation data is generated and broadcast at a first repetition frequency and the transmitted orientation data is generated and transmitted at a second, higher repetition frequency. In embodiments, the predetermined activity pattern is indicative of the user walking. In embodiments, the broadcast orientation data is broadcast in advertising packets of a wireless communication protocol, for example the BLE protocol. In embodiments, the transmitted orientation data is transmitted via a BLE protocol communication session.

FIG. 4 shows a diagram of a system 400 according to embodiments. System 400 comprises some similar elements to system 100 depicted in FIG. 1 and similar elements are similarly labelled.

In addition to apparatus 102, device 110 and server 120, system 400 also comprises apparatus 132.

Apparatus 132 comprises a wireless transceiver 132A which is capable of communicating via one or more wireless communication protocols according to embodiments. Apparatus 132 also comprises one or more processors and/or one or more memories 132B which are capable of providing various data processing and data storage/retrieval tasks according to embodiments. Apparatus 132 also comprises one or more sensors 134 (for example accelerometers) which are capable of sensing one or more parameters associated with the activity of a user of apparatus 132. Apparatus 132 is able to communicate with other devices such as device 110 over one or more wireless communication links (or paths) 142.

In system 400, the user of apparatus 102 is the same as the user of apparatus 132. In embodiments, apparatus 102 and apparatus 132 are located on a wearable item 150. In embodiments, apparatus 102 and apparatus 132 are located remote from each other on wearable item 150. If say for the example, wearable item 150 comprises a hip protector, apparatus 102 could be located in a left hip portion of wearable item 150 and apparatus 132 could be located in a right hip portion of wearable item 150.

In embodiments, apparatus 102 is referred to as a first user device, apparatus 132 is referred to as a second user device and device 110 is referred to as monitoring apparatus. In such embodiments, monitoring apparatus 110 is configured to receive first orientation data broadcast by first user device 102 in advertising packets of a wireless communication protocol, the first broadcast orientation data having been generated by first user device 102 in relation to activity of a user of first user device 102. Monitoring apparatus 110 is also configured to receive second orientation data broadcast by second user device 132 in advertising packets of a wireless communication protocol, the second broadcast orientation data having been generated by second user device 132 in relation to activity of the (same) user.

In embodiments, first user device 102 and second user device 132 are comprised in an item 150 worn by the user and first user device 102 and second user device 132 are spatially apart from each other in item 150 worn by the user.

The received first and second broadcast orientation data is analysed (for example by monitoring apparatus 110 or by server 120 after forwarding to server 120 by monitoring apparatus 110) for an indication of a movement activity pattern of the user. In response to the analysis indicating a positive indication, establishment of a first communication session with the first user device is caused and establishment of a second communication session with the second user device is caused. Establishment of the first communication session and/or establishment of the second communication session may be initiated by monitoring apparatus 110 or server 120. The movement activity pattern of the user could for example be a walking activity pattern, but could comprise any other movement activity of interest, such as running, jumping, etc.

Monitoring apparatus 110 then transmits a first command to first user device 102 which is operable to cause first user device 102 to transmit orientation data generated by first user device to monitoring apparatus 110 via the first communication session, and transmits a second command to second user device 132 which is operable to cause second user device 132 to transmit orientation data generated by second user device 132 to monitoring apparatus 110 via the second communication session.

Using two devices worn close to the body according to embodiments, provides a significant advantage in building a picture of activity levels compared to known distal worn devices such as wrist worn devices. Such known systems are relatively inaccurate in calculating activity as it is difficult to calculate what the body is doing using just the motion of the wrist. By using two sensors worn close to the body, embodiments described herein overcome such drawbacks of known systems.

Some embodiments involve using the payload data in a BLE advertising packet to contain orientation data from two accelerometers worn on or around the hip of a user, detecting and storing this advertised data on a smartphone or other user equipment and transmitting the data to a server where the data is analysed to discern activities such as walking, sitting, lying down and then using this data to build a picture of a person's day to day activity levels.

Embodiments allow use of very low power electronics which in turn means that activity sensing electronics and a battery can be sealed in a package which does not need charging and which is constantly active. Furthermore, by building a picture of when a person is active, embodiments are able to send a command from a server (or other data analysis device) to a user device to grab a snapshot of high resolution motion data at a point when the user is more likely than not to be active. For example, if orientation data obtained from broadcast advert packets indicates that a person walks every Tuesday for 1 hour, then the system can be instructed to connect to the appropriate sensor(s) and obtain data at that time. This further enables analysis of specific gait patterns in greater detail for use in fall prediction.

Embodiments provide wearable items such as hip protectors with the ability to predict falls in advance.

Embodiments employ a Bluetooth Low Energy System on Chip microcontroller with an ultra-low power three axis accelerometer and all ancillary circuitry (for example, resistors, capacitors, inductors, etc.). The system may be fitted with a coin cell battery and sealed in an enclosure (for example made of a strain rate sensitive material). In some embodiments, the microcontroller sends a BLE advert packet which is updated with a new three axis accelerometer reading every 5 seconds. In embodiments, this data is encoded into the Manufacturing Specific Data area of the BLE advert packet. The advert packet is detected by an in-range smartphone scanning for a BLE device with a predetermined signature and data content. The data within the BLE advert is then extracted, time-stamped and stored on board the smartphone. This data is then transmitted to a server (or servers). The data (for example orientation data from both hip devices) is then analysed to build a picture of a user's daily activities. Once a pattern of activities had been discovered, the server then transmits this to the smartphone. The smartphone can then attempt to connect with the device on a day by day basis at around the time suggested by the data from the server. Once connected, the smartphone can check if the person is walking via real time analysis of the data. If the person is walking, then the phone can stay connected for a set time period to capture a snapshot of high quality gait data. This data is then transferred to the server for further analysis.

Embodiments comprise apparatus for use in monitoring user activity, the apparatus being configured to generate biometric data for a user, insert the generated biometric data into advertising packets of a wireless communication protocol, and broadcast the advertising packets comprising the generated biometric data according to the wireless communication protocol. The generated biometric data may for example comprise one or more of orientation data, temperature data, heart rate data, and breathing rate data. Other types of biometric data generated in relation to the user may be employed.

In embodiments, one or more of apparatus 102, device 110, and server 120 comprise a processor or processing system. In embodiments, the processing system comprises one or more processors and/or memory. Each device as described in relation to any of the embodiments described above may similarly comprise a processor and/or processing system. One or more of the aspects of the embodiments described herein with reference to the drawings comprise processes performed by one or more of apparatus 102, device 110, and server 120. In embodiments, one or more of apparatus 102, device 110, and server 120 comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

The above embodiments are to be understood as illustrative examples of the invention. Further embodiments of the invention are envisaged.

In some of the embodiments described above, orientation data is forwarded on to server 120 by device 110 and processing/analysis of orientation data is performed by server 120. In other embodiments, some or all of the processing/analysis of the orientation data is performed by device 110.

Some of the embodiments described above involve use of two or more sensors which operate independently to provide orientation data to a device such as device 110 across separate wireless communication links. In alternative embodiments, a first sensor could deliver provide orientation data to a second sensor (for example via a wired link between the two sensors) and the second sensor can provide orientation data for both sensors to a device such as device 110 across a single wireless communication link.

The term high-resolution data is used herein to refer to data that is captured at a higher temporal resolution than low-resolution data, i.e. sampled more frequently. This term is also used herein to refer to data that produces more parameters and/or more details of those parameters, i.e. sampling produces more in-depth, detailed and/or more extensive data than capture of low-resolution data.

In alternative embodiments, a device having a replaceable or rechargeable battery is connected all the time to monitor user activity.

In alternative embodiments, the sensing electronics on the user analyse the generated orientation data and identify times for the smartphone to connect, rather than under the instruction of the smartphone or a remote server.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An apparatus for use in monitoring user activity, the apparatus being configured to:
   generate orientation data for a user at a first repetition frequency;
   insert the orientation data into advertising packets of a wireless communication protocol at the first repetition frequency; and
   broadcast the advertising packets comprising the orientation data according to the wireless communication protocol at the first repetition frequency,
   receive a connection request from a device in response to a broadcast of the advertising packets, wherein the connection request is received in response to the orientation data in the advertising packets indicating a presence of a predetermined activity pattern of the user; and establish a connection with the device according to the wireless communication protocol, wherein the device is configured to forward the orientation data to a server configured to process the orientation data in the advertising packets and determine the presence of a predetermined activity pattern of the user.

2. The apparatus according to claim 1, further comprising: an accelerometer configured to generate the orientation data.

3. The apparatus according to claim 1, wherein the orientation data comprises current x, y, and z axis positional data for the user.

4. The apparatus according to claim 1, further configured to receive, from the device via the connection, a command to generate further orientation data for the user of the apparatus at a second repetition frequency.

5. The apparatus according to claim 4, wherein the second repetition frequency is higher than the first repetition frequency.

6. The apparatus according to claim 4, further configured to:

in response to receipt of the command, generate further orientation data for the user of the apparatus at the second repetition frequency; and transmit, at the second repetition frequency, the further orientation data to the device via the connection established with the device.

7. The apparatus according to claim 4, further configured to, in response to receipt of the command, discontinue the inserting and the broadcasting.

8. The apparatus according to claim 4, further configured to:

generate the further orientation data for the user at the second repetition frequency;

insert the further orientation data into further advertising packets of the wireless communication protocol at the second repetition frequency;

broadcast the further advertising packets comprising the further orientation data at the second repetition frequency;

receive, via the connection with the device, a request to revert to generating orientation data for the user of the apparatus at the first repetition frequency; and revert to generating orientation data for the user of the apparatus at the first repetition frequency, inserting the orientation data at the first repetition frequency into advertising packets of the wireless communication protocol, and broadcasting the advertising packets comprising orientation data according to the wireless communication protocol at the first repetition frequency.

9. The apparatus according to claim 4, further comprising: a gyroscope, wherein the apparatus is further configured to:

in response to receipt of the command, activate the gyroscope;

at the gyroscope, generate rotational data for the user of the apparatus at the second repetition frequency; and transmit, at the second repetition frequency, the rotational data to the device via the connection established with the device.

10. The apparatus according to claim 4, further comprising:

a pressure sensor, wherein the apparatus is further configured to:

in response to receipt of the command, activate the pressure sensor;

at the pressure sensor, generate pressure data for the user of the apparatus at the second repetition frequency; and transmit, at the second repetition frequency, the pressure data to the device via the connection established with the device.

11. The apparatus according to claim 1, wherein the wireless communication protocol comprises a Bluetooth Low Energy (BLE) protocol and the advertising packets comprise BLE advertising packets.

12. The apparatus according to claim 11, wherein the apparatus is further configured to insert the orientation data into manufacturing-specific data portions of the BLE advertising packets.

13. The apparatus according to claim 1, wherein the first repetition frequency is less than or equal to 1 Hz.

14. The apparatus according to claim 4, wherein the second repetition frequency is greater than or equal to 50 Hz.

15. The apparatus according to claim 11, wherein the predetermined activity pattern is indicative of the user walking.

16. The apparatus according to claim 11, wherein the device is configured to process the orientation data in the advertising packets and determine the presence of a predetermined activity pattern of the user.

17. The apparatus according to claim 1, wherein the apparatus is encapsulated within a sealed enclosure.

18. The apparatus according to claim 17, wherein the sealed enclosure comprises a strain rate sensitive material.

19. The apparatus according to claim 17, comprising a non-rechargeable battery, wherein the non-rechargeable battery is encapsulated within the sealed enclosure.

20. The apparatus according to claim 1, wherein the device comprises one or more of:

a mobile telephone, or a wireless access point.

21. The apparatus according to claim 2, further comprising:

a further accelerometer, wherein the apparatus is further configured to:

generate further orientation data for the user at the further accelerometer;

insert the further orientation data into further advertising packets of the wireless communication protocol; and broadcast the further advertising packets comprising the further orientation data according to the wireless communication protocol.

22. The apparatus according to claim 21, wherein the accelerometer and the further accelerometer are located remote from each other on the apparatus.

23. A wearable item comprising an apparatus for use in monitoring user activity, the apparatus being configured to:

generate orientation data for a user at a first repetition frequency;

insert the orientation data into advertising packets of a wireless communication protocol at the first repetition frequency; and broadcast the advertising packets comprising the orientation data according to the wireless communication protocol at the first repetition frequency;

receive a connection request from a device in response to a broadcast of the advertising packets, wherein the connection request is received in response to the orientation data in the advertising packets indicating a presence of a predetermined activity pattern of the user, and establish a connection with the device according to the wireless communication protocol,
wherein the device is configured to forward the orientation data to a server configured to process the orientation data in the advertising packets and determine the presence of a predetermined activity pattern of the user.

24. The wearable item according to claim 23, comprising one or more of:
a hip protector,
a limb protector,
a back protector,
body armor,
a glove,
a jacket,
a helmet,
a sports garment,
an activity monitoring garment,
a sensor equipped garment,
personal protective equipment, or
a medical device.

25. A method of monitoring user activity, the method comprising:
generating orientation data for a user at a first repetition frequency;
inserting the orientation data into advertising packets of a wireless communication protocol at the first repetition frequency;
broadcasting the advertising packets comprising the orientation data according to the wireless communication protocol at the first repetition frequency;
receiving a connection request from a device in response to a broadcast of the advertising packets, wherein the connection request is received in response to the orientation data in the advertising packets indicating a presence of a predetermined activity pattern of the user; and
establishing a connection with the device according to the wireless communication protocol,
wherein the device is configured to forward the orientation data to a server configured to process the orientation data in the advertising packets and determine the presence of a predetermined activity pattern of the user.

26. A non-transitory computer-readable medium comprising a set of instructions, which, when executed by a processor of an apparatus, cause the apparatus to perform a method of monitoring user activity, the method comprising:
generating orientation data for a user at a first repetition frequency;
inserting the orientation data into advertising packets of a wireless communication protocol at the first repetition frequency; and
broadcasting the advertising packets comprising the orientation data according to the wireless communication protocol at the first repetition frequency;
receive a connection request from a device in response to a broadcast of the advertising packets, wherein the connection request is received in response to the orientation data in the advertising packets indicating a presence of a predetermined activity pattern of the user; and
establish a connection with the device according to the wireless communication protocol,
wherein the device is configured to forward the orientation data to a server configured to process the orientation data in the advertising packets and determine the presence of a predetermined activity pattern of the user.

27. An apparatus for use in monitoring user activity, the apparatus being configured to:
generate biometric data for a user at a first repetition frequency;
insert the biometric data into advertising packets of a wireless communication protocol at the first repetition frequency; and
broadcast the advertising packets comprising the biometric data according to the wireless communication protocol at the first repetition frequency,
receive a connection request from a device in response to a broadcast of the advertising packets, wherein the connection request is received in response to the biometric data in the advertising packets indicating a presence of a predetermined activity pattern of the user, and
establish a connection with the device according to the wireless communication protocol,
wherein the device is configured to forward the biometric data to a server configured to process the biometric data in the advertising packets and determine the presence of a predetermined activity pattern of the user.

28. The apparatus according to claim 27, wherein the biometric data comprises one or more of:
orientation data,
temperature data,
heart rate data, or
breathing rate data.

* * * * *